(12) United States Patent
St. Amour et al.

(10) Patent No.: US 9,242,877 B2
(45) Date of Patent: Jan. 26, 2016

(54) PROCESS FOR THE PURIFICATION OF IRON SALT SOLUTIONS

(75) Inventors: Sheila St. Amour, Schereville, IN (US); Jan Pavlicek, Detroit, MI (US)

(73) Assignee: Kemira Oyj, Helsinki (FI)

( * ) Notice: Subject to any disclaimer, the term of this patent is extended or adjusted under 35 U.S.C. 154(b) by 95 days.

(21) Appl. No.: 13/977,313

(22) PCT Filed: Jan. 6, 2012

(86) PCT No.: PCT/US2012/020422
§ 371 (c)(1),
(2), (4) Date: Aug. 15, 2013

(87) PCT Pub. No.: WO2012/094559
PCT Pub. Date: Jul. 12, 2012

(65) Prior Publication Data
US 2013/0313202 A1   Nov. 28, 2013

Related U.S. Application Data

(60) Provisional application No. 61/430,250, filed on Jan. 6, 2011.

(51) Int. Cl.
| | | |
|---|---|---|
| *C02F 1/52* | (2006.01) | |
| *C02F 1/62* | (2006.01) | |
| *C02F 1/56* | (2006.01) | |
| *C02F 1/66* | (2006.01) | |
| *C01G 23/047* | (2006.01) | |
| *C02F 1/02* | (2006.01) | |
| *C02F 101/20* | (2006.01) | |

(52) U.S. Cl.
CPC ... *C02F 1/52* (2013.01); *C02F 1/02* (2013.01); *C02F 1/5245* (2013.01); *C02F 1/56* (2013.01); *C02F 1/66* (2013.01); *C01G 23/0475* (2013.01); *C02F 2101/20* (2013.01)

(58) Field of Classification Search
CPC ............ C02F 1/02; C02F 1/52; C02F 1/5236; C02F 1/5245; C02F 1/56; C02F 1/62; C02F 1/64; C02F 1/66; C02F 2101/20; C02F 2101/203; C02F 2101/206; C02F 2001/007; C01G 23/047; C01G 23/0475
USPC ........ 210/723, 724, 737, 766; 423/69, 73, 86, 423/150.3
See application file for complete search history.

(56) References Cited

U.S. PATENT DOCUMENTS

| | | | | |
|---|---|---|---|---|
| 5,032,367 | A * | 7/1991 | Hirai et al. ..................... | 423/142 |
| 5,407,650 | A * | 4/1995 | Hartmann et al. .............. | 423/50 |
| 5,527,469 | A * | 6/1996 | Lawhorne et al. ............. | 210/710 |
| 5,707,599 | A * | 1/1998 | Northway ................ | 423/594.17 |
| 2002/0153307 | A1* | 10/2002 | Blais et al. .................... | 210/631 |
| 2006/0151398 | A1 | 7/2006 | Uegami et al. | |

OTHER PUBLICATIONS

International Search Report for PCT/US2012/020422, issued Apr. 30, 2012.

* cited by examiner

*Primary Examiner* — Joseph Drodge
(74) *Attorney, Agent, or Firm* — King & Spalding

(57) ABSTRACT

A process is provided for removing metal salt co-constituents from an iron-containing solution comprising: (a) decreasing the free acidity of the solution to produce a slurry; (b) optionally heating the solution or the slurry to a temperature at least 30° C.; (c) optionally aging the slurry; (d) adding one or more cationic polyelectrolyte flocculants to the slurry; and (e) separating a solid-containing portion from a liquid portion of the slurry.

17 Claims, 3 Drawing Sheets

(a)

(b)

(a) (b)

(c) (d)

(a)

(b)

(a)

(b)

PROCESS FOR THE PURIFICATION OF IRON SALT SOLUTIONS

CROSS REFERENCE TO RELATED APPLICATIONS

This application is a United States national phase filing under 35 U.S.C. §371 of International Application No. PCT/US2012/020422, filed 6 Jan. 2012, which claims priority to U.S. Provisional Patent Application No. 61/430,250, filed 6 Jan. 2011. The complete disclosure for each of the above-identified applications is hereby fully incorporated herein by reference.

FIELD OF THE INVENTION

The present disclosure relates to a process for removing metal salt co-constituents from iron chloride solutions, and more particularly to a process for removing dissolved niobium, titanium and zirconium from iron chloride solutions.

BACKGROUND OF THE INVENTION

Solutions of ferrous and ferric iron salts have well established utility in numerous scenarios in the treatment of potable water and wastewaters. Ferrous solutions can also be used as base material in the manufacture of ferric chloride solution products which have separate market values in potable water and wastewater treatment applications.

One of the major sources of these iron salt solutions, of both sulfate and chloride anion, is from the titanium dioxide ($TiO_2$) manufacturing processes, wherein the use of various grades of ilmanite or rutile type ores produces iron salt side streams with varying amounts of metal salt co-constituents. These metal salt co-constituents can include salts of a variety of metals, including titanium, chromium, zirconium, niobium, manganese and other metals in relatively high concentrations. In the $TiO_2$ industry, these iron solutions are generally disposed by neutralization, dewatering, and landfill, or deepwelled as hazardous waste. In some cases, the solutions are purified and sold as ferrous chloride or ferric chloride solution for wastewater and potable water treatment. However, the chlorides and hydroxychlorides of titanium, niobium, and zirconium in these solutions slowly precipitate as fine solids. As these fine precipitates accumulate they will cause problems in storage and handling of the solutions at the customers' sites as the fine precipitates settle and subsequently clog tanks, strainers, and pumping lines. This equipment then needs to be taken out of service for cleaning, incurring costs and interruption of service.

All methodologies, to date, have been relatively ineffectual or are very inefficient in preventing or removing these precipitates from the materials and the industry has learned to adjust to the issue but with significant cost. Accordingly, the marketable value of the iron solution to the water treating industry will generally be inversely proportionate to the levels of co-constituents carried in the solution. Therefore, there is value in discovering methods of reducing the levels of co-constituents in the iron solutions. Furthermore, these iron solutions are produced in concentrations that are too low to provide viable market access. It is therefore advantageous to determine beneficial methods of concentrating iron.

There exists a need for an improved process for separating impurities, including metal salt co-constituents such as niobium, titanium, zirconium and other metal salt co-constituents, from these iron chloride solutions, leaving a stable iron chloride solution that does not precipitate fine solids.

SUMMARY OF THE INVENTION

A process for removing metal salt co-constituents from an iron-containing solution comprising: (a) decreasing the free acidity of the solution to produce a slurry; (b) optionally heating the solution or the slurry to a temperature at least 30° C.; (c) optionally aging the slurry; (d) adding one or more cationic polyelectrolyte flocculants to the slurry; and (e) separating a solid-containing portion from a liquid portion of the slurry.

DESCRIPTION OF THE INVENTION

Figure 1:
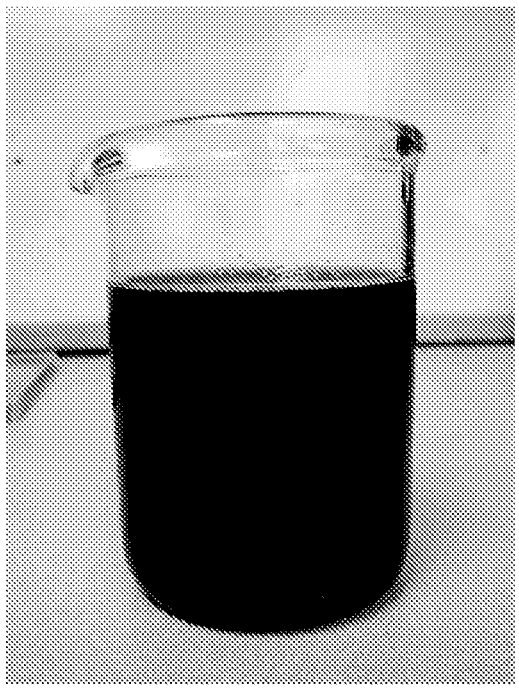
FIG. 1 shows the ferric chloride solution before treatment (FIG. 1a), the reacted ferric chloride to ferrous chloride with residual steel after reduction treatment (FIG. 1b), the solution decanted from steel (FIG. 1c) and the solution decanted from grit after settling overnight (FIG. 1d).
Figure 1:
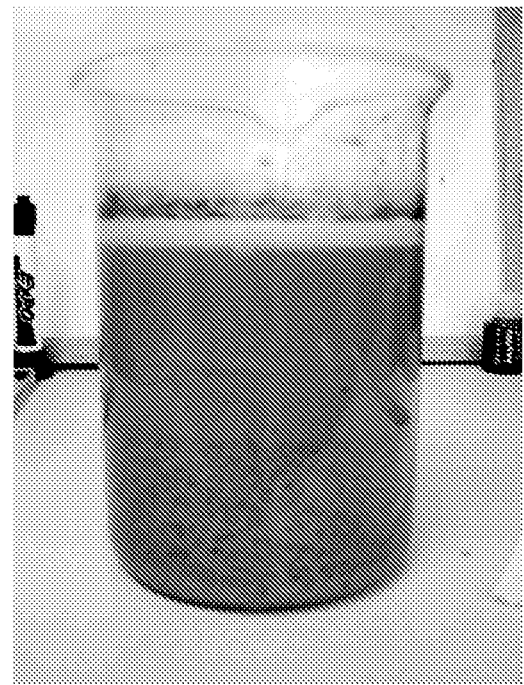
Figure 1:
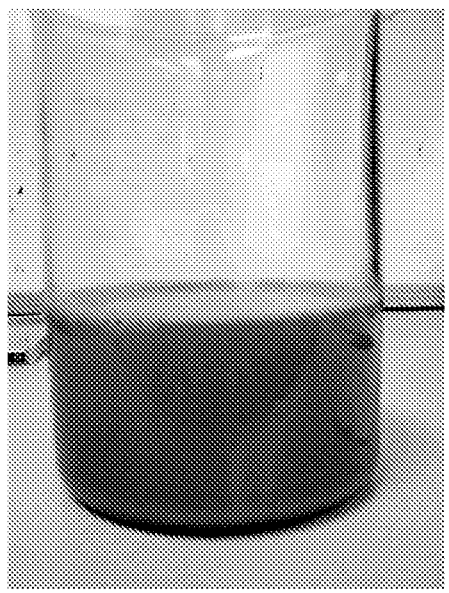
Figure 1:
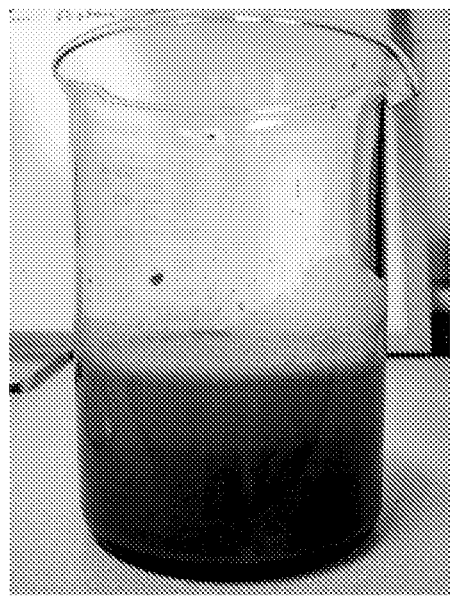

It has been found that by reducing the free acidity (increasing the pH) of ferrous iron solutions the co-constituents will hydrolyze to form solid precipitates of the metals without appreciably decreasing the iron salt solution concentration. This process of separating the ferrous iron solution from the co-constituent metal products results in a liquor of purified ferrous iron solution and a concentrated slurry of hydrolyzed and precipitated co-constituents. This process may also be used to increase concentrations of ferric iron solutions.

The invention provides a process for removing metal salt co-constituents from an iron-containing solution comprising: (a) decreasing the free acidity of the solution to produce a slurry; (b) optionally heating the solution or the slurry to a temperature at least 30° C.; (c) optionally aging the slurry; (d) adding one or more cationic polyelectrolyte flocculants to the slurry; and (e) separating a solid-containing portion from a liquid portion of the slurry. The process provided herein can be used to increase the ferric or ferrous concentration of an iron-containing solution or to reduce the metal salt co-constituents of the iron-containing solution.

In particular embodiments, the process can be used to remove metal salt co-constituents, for example one or more niobium, titanium, manganese or zirconium compounds. In a particular embodiment, the processes described herein may be used to produce a slurry wherein the metal salt co-constituents remaining in the liquid portion of the processes described herein are less than about 2%, about 1%, about 0.5%, about 0.1%, about 0.05%, or about 0.01% the amount of co-constituents in the original iron-containing solution.

In certain embodiments, the process can be used to remove organic compounds. In one embodiment, the iron chloride solution is a byproduct of the chlorination process for making titanium dioxide.

In one embodiment, ferric compounds or ferric iron in the iron-containing solution are converted to ferrous compounds or ferrous iron. Typically, the original iron-containing solution comprises about 8 to about 14% (weight/weight) ferric iron. In certain embodiments, the iron-containing solution comprises about 8 to about 14%, about 10 to about 14%, or about 10.5 to about 12% (weight/weight) ferric iron.

The process described herein comprises the step of decreasing the free acidity of the solution to produce a slurry. Free acidity as used herein refers to the portion of the total acidity that exists in the form of acid, both ionized and un-ionized. The free acidity of the solution can be decreased by adding a reagent which decreases the free acidity or heating the solution or a combination thereof. The free acidity of the acidity of the iron-containing solution is decreased at least in part by the removal of hydrochloric acid from the solution.

In one embodiment, the solution is heated to a temperature of 30° C. to 90° C. In certain embodiments, the solution is not heated above 90° C. to decrease the free acidity.

In one embodiment, the free acidity of the solution is decreased by adding a reagent to the iron-containing solution or exposing the iron-containing solution to a reagent. Reagents that may be used to decrease the free acidity of the iron-containing solution include but are not limited to alkaline materials and steel. In certain embodiments, the reagent may be one or more reagents selected from steel, a material which comprises $Fe_3O_4$, a material which comprises $Fe_2O_3$; CaO, $Ca(OH)_2$, NaOH, $NH_4OH$, elemental iron, or other alkaline material. In one embodiment, the reagent which decreases the free acidity is steel, for example the free acidity of the iron-containing solution is decreased by exposing the solution to steel. In another embodiment, the reagent which decreases the free acidity is elemental iron. In one embodiment, the reactant which decreases the free acidity is an alkaline material or steel.

The free acidity of the solution may be measured by any method known in the art, for example titrimetric determination. In one embodiment, the processes described herein comprise the step of decreasing the free acidity of the solution to a pH of between about 0 and about 2.5, or about 0.5 to about 1.5. The process described herein may be used to decrease the free acidity of the iron-containing solution to a negative acidity, for example up to about −1% free acidity, or up to about −2% free acidity. The amount of reagent required to reduce the free acidity to the desired levels will vary depending on the composition of the iron-containing solution and can be determined by titrimetric methods.

The process described herein optionally comprises the step of heating the iron-containing solution or slurry. In a particular embodiment, the slurry is heated after the free acidity of the solution has been decreased. This optional heating step may comprise heating the solution or slurry to a temperature of at least 30° C., at least 40° C., at least 50° C., at least 60° C., at least 70° C., or at least 80° C. In this step, the solution or slurry is not heated above 90° C. In one embodiment, the solution is heated to a temperature of about 30° C. to about 90° C. In one embodiment, the solution is heated after decreasing the free acidity of the solution. In one embodiment, the process does not require that the solution be heated after decreasing the free acidity of the solution.

The process described herein comprises the optional step of aging the slurry. Aging methods are well known to those of skill in the art and are not limited to those described herein. Aging conditions the solution after the reduction of the acidity has been achieved so as to regulate and optimize the quantities and characteristics of co-constituent metal hydrolysis products and the accompanying solution. Generally, aging the slurry refers to the maturation and/or formation or crystals and/or precipitates. In certain embodiments, aging ins used to achieve crystal morphologies as large and as homogeneous as possible. In one embodiment, aging in used to precipitate or crystallize metal salt co-constituents. In certain embodiments, aging involves allowing the slurry sufficient time to form the optimal amount and/or purity of precipitates and/or crystals of the metal salt co-constituents.

In one embodiment, the slurry is cooled to less than 40° C. to reduce the rate of hydrolysis product formation. In another embodiment, the slurry proceeds to the next step in a shortened time frame to curtail hydrolysis product formation. In another embodiment, a combination of any of the above methods for regulating the formation of hydrolysis products is used.

The process described herein comprises the step of adding one or more cationic polyelectrolyte flocculants or coagulants to the slurry. A flocculant or coagulant as used herein refers to a solid liquid separating agent. The cationic polyelectrolyte flocculants or coagulants enhance the separation of solids from the liquid. Cationic polyelectrolyte flocculants or coagulants appropriate for use in this step include, but are not limited to, polymeric and non-polymeric cationic polyelectrolyte compounds, for example diallyldimethylammonium chloride, poly(allylamine hydrochloride), poly(diallyldimethylammonium chloride), methacrylamido propyl trimethyl ammonium chloride, quaternary polyamine compounds, copolymers with acrylamide, and polyethylene imines. Cationic polyelectrolytes are typically homopolymers or co-polymers with acrylamide. A wide range of cationic polyelectrolytes with varying charge densities and molecular weights are available. Exemplary polyelectrolytes include but are not limited to Kemira Superfloc products C-1596, C-1598, C-581, C-573, C-4880, C-4893 or similar materials from other suppliers. In one embodiment, the slurry is treated with a cationic polymer that flocculates the solid portion separating it from the liquid portion.

In certain embodiments, with considerations for time, temperature and residual acidity as they relate to the growth and characteristics of hydrolysis products formed, the process comprises coagulation and/or flocculation with commercially available polyelectrolytes, for example Kemira Superfloc C1596, followed by the separation of the liquid portion from the solid portion of the slurry comprises sedimentation, filtration, centrifugation methods or combinations thereof.

The process described herein comprises the step of separating a solid portion from a liquid portion of the slurry. The separation of solids from the liquid may be accomplished by any method know in the art, for example, sedimentation, filtration, centrifugation or a combination thereof. The solid portion or solids comprise one or more metal salt co-constituents, for example manganese, titanium, zirconium or niobium compounds. The liquid portion comprises a liquid or solution comprising iron compounds. The process described herein may be used advantageously to provide liquid portions with higher concentrations of iron-containing compounds than the initial iron-containing solution. In one embodiment, the separation step comprises sedimentation. In one embodiment, the separation step comprises filtration. In one embodiment, the separation step comprises centrifugation.

In one embodiment, the liquid portion comprises increased concentrations of iron-containing compounds, for example compounds comprising ferric or ferrous iron. In a particular embodiment, the liquid portion comprises at least about 12%, about 13%, about 14%, about 15%, about 16%, about 17%, or about 18% (weight/weight) ferric or ferrous iron. In certain embodiments, the liquid portion comprises about 13% to about 21%, about 14% to about 21%, about 15% to about 18%, or about 16% to about 17% (weight/weight) ferric or ferrous iron.

The process may be used to increase the concentration of ferrous iron in the liquid portion. In certain embodiments, once the process has been applied to the iron-containing solution, the liquid portion of the slurry comprises at least about 12%, about 13%, about 14%, about 15%, about 16%, about 17%, or about 18% (weight/weight) ferrous iron or about 12 to about 21%, about 13% to about 21%, about 14% to about 21%, about 12 to about 17%, about 13 to about 17%, about 14 to about 17%, about 15 to about 17%, about 15% to about 18%, or about 16 to about 17% (weight/weight) ferrous iron.

The process may be used to increase the concentration of ferric compounds in the liquid portion. In certain embodiments, once the process has been applied to the iron-containing solution, the liquid portion of the slurry comprises at least about 12%, about 13%, about 14%, about 15%, about 16%, about 17%, or about 18% (weight/weight) ferric iron or about 12 to about 21%, about 13% to about 21%, about 14% to about 21%, about 12 to about 17%, about 13 to about 17%, about 14 to about 17%, about 15 to about 17%, about 15% to about 18%, or about 16 to about 17% (weight/weight) ferric iron.

The liquid portion may comprise both ferrous and ferric compounds. In a particular embodiment, the liquid portion comprises about 13% to about 21%, about 14% to about 21%, about 15% to about 18%, or about 16% to about 17% (weight/weight) ferrous compounds, and about 0% to about 1%, about 0% to about 0.5%, or about 0% to about 0.3% (weight/weight) ferric compounds.

The liquid portion may comprise metal salt co-constituents. Generally, the metal salt co-constituents remaining in the liquid portion are less than about 10%, about 8%, about 5%, about 2%, about 1%, about 0.5%, about 0.1%, about 0.05%, or about 0.01% the amount of co-constituents in the original iron-containing solution.

The solid portion or solid comprises metal salt co-constituents. Co-constituents as used herein refers to other compounds in the iron-containing solution which may include inorganic or organic impurities, for example metal salts. The metal salt co-constituents in the iron-containing solutions may be removed by the process described herein and used in other applications. Typically, the metal salt co-constituents comprise one or more manganese, titanium, zirconium or niobium compounds. In certain aspects, the concentration of titanium in the iron-containing solution is about 1000 to 10000 ppm. In one aspect, the concentration of niobium in the iron-containing solution is about 1000 to 3000 ppm. In one aspect, the concentration of zirconium in the iron-containing solution is about 1000 to 3000 ppm. In sum, the iron-containing solution typically comprises about 1000 to 15000 elemental metal salt co-constituents before the process of the present invention is applied to the solution.

In one embodiment, the solution or slurry is further treated to enhance separation of the metal salt co-constituents from the iron-containing solution.

The invention is illustrated by the following non-limiting examples.

EXAMPLE 1

Purification of Co-Constituent Metal Salt Laden Iron Salt Solutions 0.5% cationic polyelectrolyte flocculant solution was prepared by adding 1 mL cationic polyelectrolyte flocculant to 200 mLs tap water. The solution was mixed and aged for at least 2 hours.

Figure 2:
FIG. 2 shows the solution after mixing with cationic polyelectrolyte flocculant (FIG. 2a) and the solution after mixing with cationic polyelectrolyte flocculant and settling for 30 minutes (FIG. 2b).
Figure 2:
Figure 3:
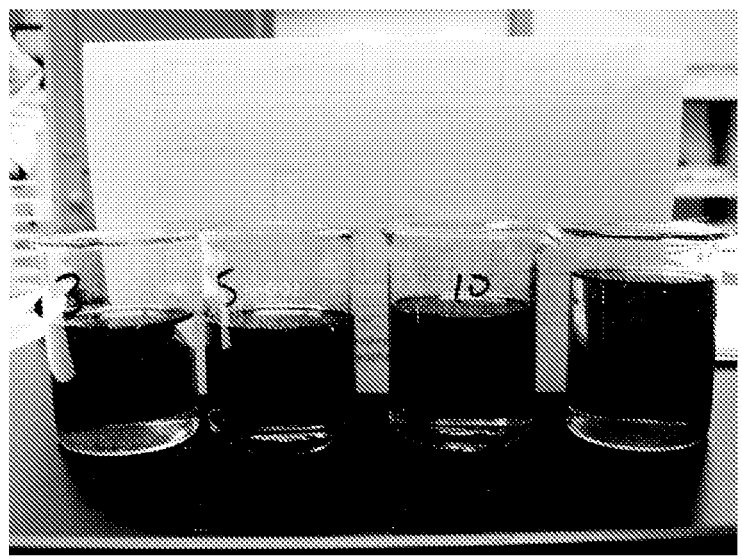
FIG. 3 shows the ferrous chloride solution after centrifugation (FIG. 3a) and the air-dried solids (FIG. 3b).
Figure 3:

A ferric chloride solution (11.6% Fe(III)) was reacted with steel to form slurried solution of ferrous chloride and co-constituent metal hydrolysis solids. The solution decanted from steel residuals and allowed to age overnight. The slurried solution was decanted from the heavier and easily separable grit solids. The supernatant was divided into four 100-mL portions. 3 mLs, 5 mLs, 10 mLs, or 20 mLs cationic polyelectrolyte flocculant was added to each 100 mL supernatant aliquot and mixed by 'boxing' cups. Each solution was allowed to settle at least 30 minutes and was then centrifuged. The supernatant was decanted from co-constituent metal hydrolysis solids. The solids were washed with three 35 mL portions of water and digested in a mixture of nitric, hydrochloric, and hydrofluoric acids for metals analysis. Samples were analyzed for major constituents (see Tables 1-3). FIGS. 1 though 3 depict the ferric chloride solution before treatment (FIG. 1a), the reacted ferric chloride to ferrous chloride with residual steel after reduction treatment (FIG. 1b), the solution decanted from steel (FIG. 1c), the solution decanted from grit after settling overnight (FIG. 1d), the solution after mixing with cationic polyelectrolyte flocculant (FIG. 2a), the solution after mixing with cationic polyelectrolyte flocculant and settling for 30 minutes (FIG. 2b), the ferrous chloride solution after centrifugation (FIG. 3a), and the air-dried solids (FIG. 3b). From this example, it is shown that the solution metal salt co-constituents remaining in the liquid portion are less than about 0.01% the amount of the co-constituents in the original iron-containing solution.

TABLE 1

Supernatant Analysis

| | 3 ml | 5 ml | 10 ml | 20 ml |
|---|---|---|---|---|
| % Ferrous | 15.46 | 15.25 | 14.78 | 13.38 |
| % Ferric | 0.18 | 0.22 | 0.18 | 0.23 |
| % Free Acid as HCl | −0.65 | −0.44 | −0.59 | −0.60 |
| Mn mg/kg | 1690 | 1710 | 1670 | 1510 |
| Ti mg/kg | 1.2 | 3.9 | 4.9 | 3.1 |
| Zr mg/kg | 4.8 | 5.9 | 6.3 | 5.3 |
| Nb mg/kg | ND at 1 | ND at 1 | ND at 1 | ND at 1 |
| Al mg/kg | 2410 | 2410 | 2370 | 2170 |

TABLE 2

Wash Water Analysis

| | 3 ml Wash #1 | 5 ml Wash #1 | 10 ml Wash #1 | 20 ml Wash #1 | 3 ml Wash #3 | 5 ml Wash #3 | 10 ml Wash #3 | 20 ml Wash #3 |
|---|---|---|---|---|---|---|---|---|
| % Ferrous | 4.61 | 4.67 | 4.57 | 2.64 | NA | NA | NA | NA |
| % Ferric | 0.14 | 0.14 | 0.14 | 0.13 | NA | NA | NA | NA |
| Mn mg/kg | 394 | 411 | 399 | 259 | 19 | 17 | 18 | 2.9 |
| Ti mg/kg | 76 | 85 | 61 | 36 | 1170 | 818 | 531 | 255 |
| Zr mg/kg | 30 | 35 | 25 | 15 | 420 | 287 | 196 | 96 |

TABLE 2-continued

Wash Water Analysis

|  | 3 ml Wash #1 | 5 ml Wash #1 | 10 ml Wash #1 | 20 ml Wash #1 | 3 ml Wash #3 | 5 ml Wash #3 | 10 ml Wash #3 | 20 ml Wash #3 |
|---|---|---|---|---|---|---|---|---|
| Nb mg/kg | 15 | 18 | 13 | 8.9 | 213 | 143 | 100 | 46 |
| Al mg/kg | 605 | 633 | 615 | 390 | 51 | 46 | 47 | 19 |
| Fe mg/kg | NA | NA | NA | NA | 1630 | 1410 | 1480 | 224 |

TABLE 3

Solids Analysis

|  | 3 ml | 5 ml | 10 ml | 20 ml |
|---|---|---|---|---|
| Mn mg/kg | 21 | 18 | 19 | 13 |
| Ti mg/kg | 33300 | 30100 | 27700 | 22400 |
| Zr mg/kg | 13800 | 12500 | 11500 | 9460 |
| Nb mg/kg | 6070 | 5520 | 5030 | 4170 |
| Al mg/kg | 231 | 207 | 197 | 160 |
| Fe mg/kg | 6410 | 5840 | 5260 | 3790 |

We claim:

1. A process for removing metal salt co-constituents from an iron-containing solution comprising:
   a. decreasing the free acidity of the solution to a pH of between about 0.5 and 1.5 to produce a slurry by adding a reactant selected from steel and a material which comprises $Fe_3O_4$;
   b. optionally heating the solution or the slurry to a temperature at least 30° C.;
   c. optionally aging the slurry;
   d. adding one or more cationic polyelectrolyte flocculants to the slurry; and
   e. separating a solid-containing portion from a liquid portion of the slurry;
      wherein the solid-containing portion comprises one or more metal salt co-constituents selected from titanium, zirconium or niobium;
      wherein the liquid portion comprises iron-compounds.

2. The process of claim 1, wherein the reactant is steel.

3. The process of claim 1, wherein the reactant is a material which comprises $Fe_3O_4$.

4. The process of claim 1, wherein the solution or slurry is heated to a temperature of at least 30° C.

5. The process of claim 1, wherein the solution or slurry is heated to a temperature of 30° C. to 90° C.

6. The process of claim 1, wherein the solution or slurry is further treated to enhance separation of the metal salt co-constituents from the iron-containing solution.

7. The process of claim 1, wherein the slurry is treated with a cationic polymer that flocculates the solid portion separating it from the liquid portion.

8. The process of claim 1, wherein the metal salt co-constituents remaining in the liquid portion are less than about 2% the amount of co-constituents in the original iron-containing solution.

9. The process of claim 1, wherein the metal salt co-constituents remaining in the liquid portion are less than about 1% the amount of co-constituents in the original iron-containing solution.

10. The process of claim 1, wherein the separation of the liquid portion from the solid portion comprises sedimentation, filtration, centrifugation or a combination thereof.

11. The process of claim 1, wherein the iron-containing solution comprises about 8 to about 14% (weight/weight) ferric iron.

12. The process of claim 1, wherein liquid portion comprises at least about 12% (weight/weight) ferrous iron.

13. The process of claim 11, wherein liquid portion comprises about 12 to about 17% (weight/weight) ferrous iron.

14. The process of claim 1, wherein the metal salt co-constituents remaining in the liquid portion are less than about 0.01% the amount of co-constituents in the original iron-containing solution.

15. The process of claim 1, wherein the titanium remaining in the liquid portion are less than about 0.01% the amount of titanium in the original iron-containing solution.

16. The process of claim 1, wherein the zirconium remaining in the liquid portion are less than about 0.05% the amount of zirconium in the original iron-containing solution.

17. The process of claim 1, wherein the niobium remaining in the liquid portion are less than about 0.05% the amount of niobium in the original iron-containing solution.

* * * * *